July 23, 1957 A. TALALAY ET AL 2,800,165
REINFORCED FOAM RUBBER CUSHIONING MATERIAL
Filed June 8, 1953 4 Sheets-Sheet 3
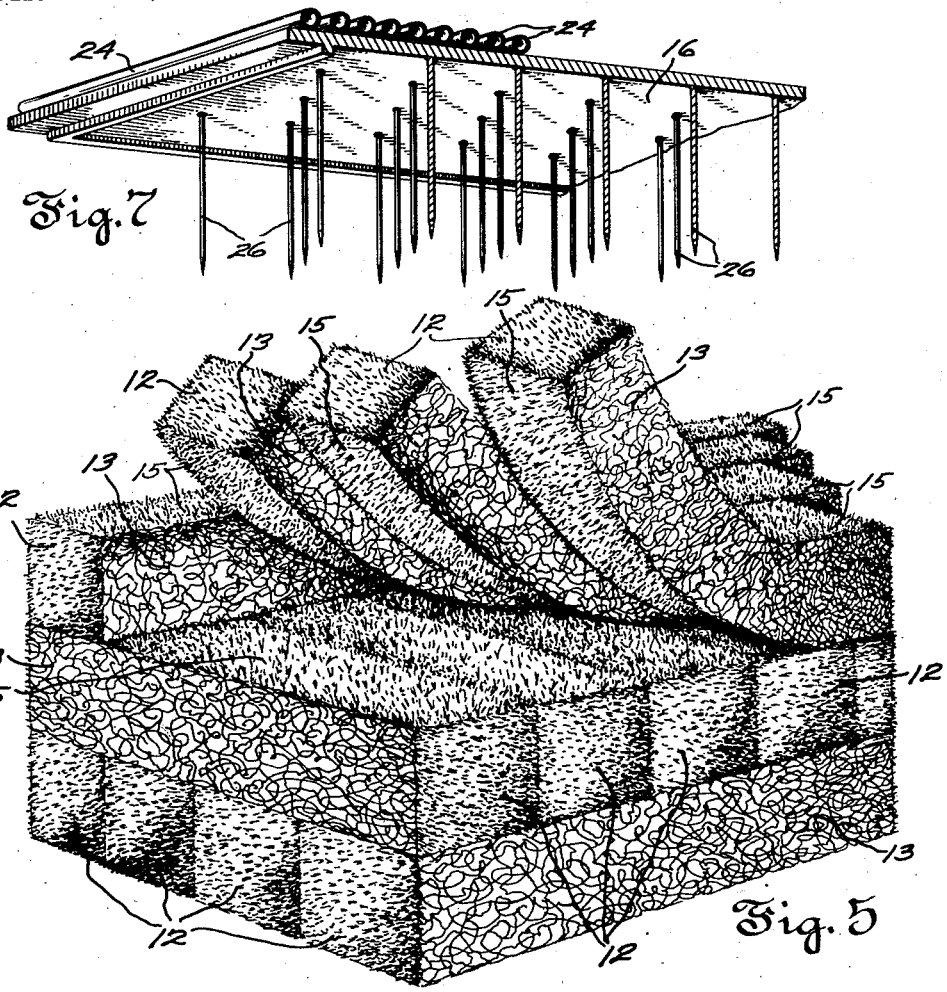
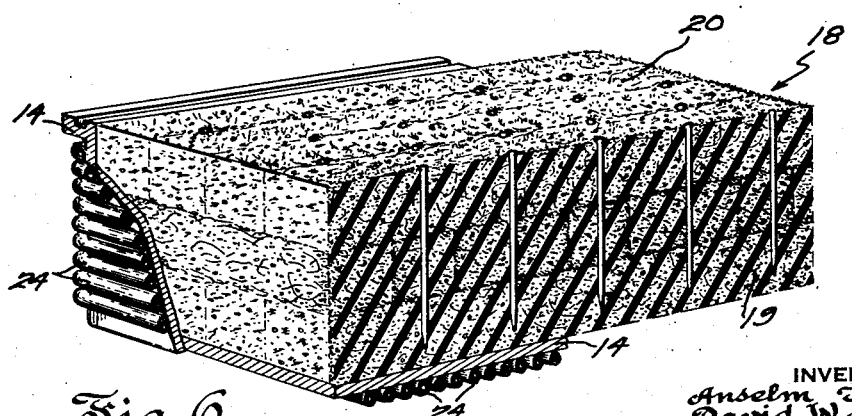
INVENTORS
Anselm Talalay
David W Jones
BY
ATTORNEY 2,800,165
Patented July 23, 1957

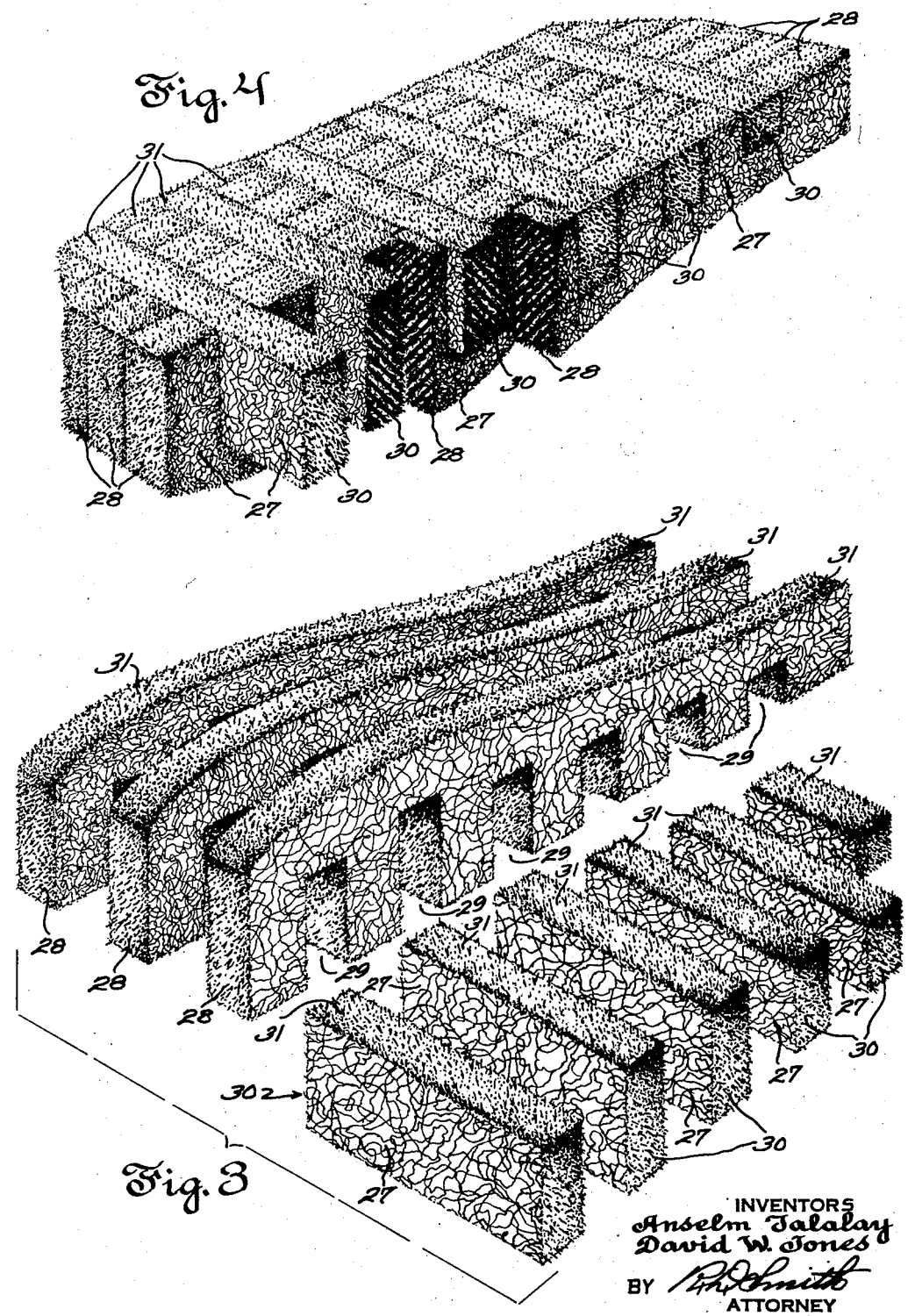

2,800,165
REINFORCED FOAM RUBBER CUSHIONING MATERIAL

Anselm Talalay, New Haven, and David W. Jones, Shelton, Conn., assignors, by mesne assignments, to The B. F. Goodrich Company, Akron, Ohio, a corporation of New York Application June 8, 1953, Serial No. 360,042

7 Claims. (Cl. 155—179)

This invention relates to resilient cushioning bodies of long range elasticity and of very light weight and particularly to cushioning bodies incorporating foamed latex sponge.

More specifically the invention relates to articles of a composition that may be termed "combination" material comprising a unitary continuous entire mass of foam rubber reinforced by a fibrous or filamentous content in the form of a self integrated skeleton framework of prevulcanized rubberized hair and possessing as a consequence an increased resistance to elastic compression while maintaining an extremely light bulk density. Resistance to elastic compression may be defined variously as "high specific compression resistance" or "high load carrying capacity." It is an economically desirable property in foam rubber. It is particularly desirable in uses where light body weight is important, as in cushions for aircraft seating.

One object of the present invention is to provide a fiber-reinforced cellular rubber cushioning body of unusually high load carrying capacity in proportion to a very low weight factor or density.

A contributary object is to attain such relationship of physical properties in a cushioning body by an improved structural arrangement of the fibrous prevulcanized skeleton framework of rubberized hair of the aforesaid combination material of which the body is composed. The nature of our improved arrangement disposes a preponderance of the embedded fibers in concerted directions such that the axes of most of the fibers are dominantly disposed more nearly normal to than parallel with the load bearing or pressure receiving surfaces of a cushioning body composed of the finished material. The load receiving surface of a seat cushion measuring, say, 24" in length by 24" in width by 5" in thickness ordinarily would be either of the two 24" x 24" faces which may be termed the broadside faces, while the surfaces measuring 5" x 24" may appropriately be termed the edge surfaces.

A further object is to provide a cushioning body whose fibrous content is constituted and arranged as above and which at the same time is strongly resistive to sidewise distortion in its load caused deformation.

A still further object is to attain relief from side sway in such a cushioning body by means of stays comprising mutually crossing and abutting slabs, bars or strips of the aforesaid combination material.

In general it is an aim of the present improvements in a cushioning body to derive aid in resistance to compression from the greater resilient strength offered by individual resilient fibers of the aforesaid fibrous skeleton when arranged to bear a load applied mainly in the direction of their long axes as distinguished from bearing a load applied transversely of the lengths of the fibers.

The foregoing and other objects of the invention are dealt with in greater particular in the following description of successful embodiments of the invention having reference to the accompanying drawings wherein:

Fig. 3 is an exploded view of component pieces of empty network of rubberized hair ready to be fitted together in the relationship shown in Fig. 4.

Fig. 4 shows the separate pieces of Fig. 3 assembled in criss-crossed, closely interfitting relation ready to be unified by a continuous undivided unitary filling of foam rubber to make a cushioning body of combination material shown inverted or right side up in Fig. 2.

Fig. 5 shows a modified arrangement of criss-crossed, mutually abutting strips of empty network of rubberized hair wherein a plurality of layers of such strips are ready to be unified by having the interstices of all of them filled with an undivided continuous unitary mass of foam rubber.

Fig. 6 shows a mold filled with the strips of Fig. 5 after the interstices of all the strips have been filled with an undivided continuous mass of latex foam permanently coagulated into a unitary body of foam rubber.

Fig. 7 shows the cover of the mold of Fig. 6 removed.

So called rubberized hair, of which a well known brand is commercially termed "Hairlock," is usually produced on continuous sheet or bat forming apparatus either by garnetting or by "shedding" or by "spreading" curled animal hairs to form a loose dry bat, followed by spraying such bat with an aqueous dispersion of an elastomer, and then drying, and vulcanizing the sprayed bat.

In the process of so-called "shedding," the hair is carried over a metallic wire roll and brushed off this roll by a rapidly rotating wire brush cylinder. As a result more or less individual curled hair filaments are projected through space and are caused to come to rest on a horizontal traveling conveyor where they arrange themselves in more or less random distribution and entangled relation to form a dry bat.

We have found that a directional distribution of the running lengths of the filaments can be obtained by the above method of "shedding" that is far from equal in the three dimensional perpendicularly related directions that may be designated respectively X, Y and Z. If X denotes the direction of the moving conveyor onto which the hair is shed, Y the horizontal or lateral direction transverse the same, and Z the vertical direction through the thickness of the dry bat, it will be found that there will be a pronounced alignment of longitudinal axes of the fibers that predominates in the horizontal directions X and Y rather than in the vertical direction Z.

For example we have found that when curled hair composed of 50% winter hog hair and 50% cattle-tail hair is "shed" onto a moving perforated conveyor and rubberized as above to produce a ratio of fiber to binder of approximately 1 to 1, a lightweight rubberized hair (.7 pound per cubic foot) will result which will have the following compressional characteristics.

| Direction in which load applied | Load Required to Compress to 75% of Original Dimension in Load Receiving Direction | Load Required to Compress to 50% of Original Dimension in Load Receiving Direction |
|---|---|---|
| "Broadside" (in the direction of Z-axis—mostly crosswise the lengths of the hairs) | P.s.i. .75 | P.s.i. 1.6 |
| "On Edge" (in the direction of the X or Y axis—mostly in line with the the lengths of the hairs) | 2.25 | 3.2 |

In other words for a 25% compression the open framework of rubberized hair is about three times as stiff in the Z direction as it is in the X or Y directions, and for a 50% compression is twice as stiff in the Z direction as it is in the X or Y directions.

Figure 8:
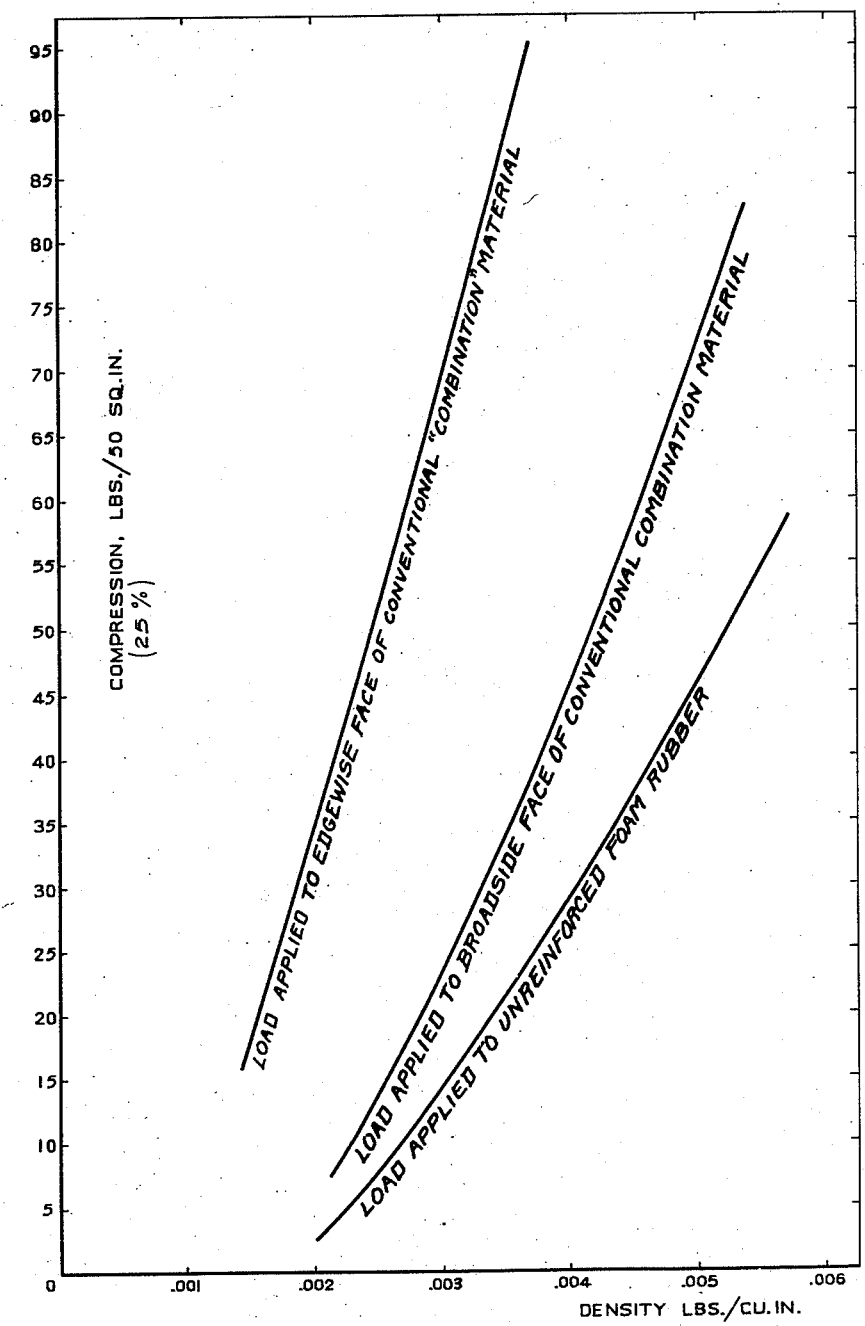
Fig. 8 is a performance test graph showing the comparative load resistive properties of certain cushioning bodies variously composed and used.

We have discovered that this anisotropy in compressional resistance of the skeleton framework of rubberized hair can be carried over into the finished product composed of the hereinbefore referred to "combination material" meaning a spot-bonded fibrous open-work structure having its interstices fully occupied by an integral bulk or undivided continuous unitary mass of lightweight foam rubber. An example of this anisotropy is illustrated in the actual test graph of Fig. 8, wherein the resistance of combination material to a 25% degree of compression to a load applied to an edgewise face, as contrasted with the resistance to a load applied to a "broadside" face, is plotted as a function of the density of a homogeneous or conventional form of "combination" material.

The advantages in cushioning properties that are capable of resulting from our newly devised structure of combination material contemplated by this invention are attained in a cushioning structure that comprises separate component empty network strips 12 of rubberized hair assembled as shown in Fig. 5 according to a newly devised principle or pattern so that the assembly components add up to the overall dimensions of the finished article.

Network strips 12 may be cut from a continuous empty network of rubberized hair spot bonded in entangled stratified disposition as hereinbefore described so that the strip surfaces 13 are the residuum of a surface of the network that lay in the aforesaid bat-forming direction X or Y, while the strip surfaces 15 result from cutting across the lengths of most of the fibers through the thickness of the bat in the aforesaid bat-forming direction Z.

Were network strips of rubberized hair such as 12 to be assembled merely in parallel relation they would tend to act like a gang of side by said individual slender columns in response to application of compressive loads applied to a cushion surface composed solely of the ends of such strips or columns. A load pressure exterted against such surface would be applied endwise against the slender columns. As a consequence the columns would tend to buckle, bow or deflect sidewise so that the finished article would possess poor lateral stability. We have therefore devised the crisscross or egg-crate arrangement of the strips shown in Figs. 2 and 5 that eliminates this tendency to lateral sway.

One way of making such assembly is by packing the network strips or elongate pieces such as 12 into a mold box 14 in such manner that the space in mold box 14 beneath the mold cover 16 (shown removed in Fig. 7) becomes completely filled with the open network strips of rubberized hair. Then the mold cover may be held down while a light weight latex foam is caused to permeate and completely fill the interstices of the entire fibrous structure of the combined network strips while the latter, as well as the latex foam, are confined in the mold.

Because the latex foam rubber so used needs be of extremely light density, and because the uniform premeation of a fibrous skeleton of rubberized hair with ready-made foam presents great difficulties, the freeze gelling method of making foam rubber set forth in U. S. Patent 2,432,353 to Talalay has been found to be particularly useful in the manufacture of foam rubber integrally reinforced with resilient fibers. This above mentioned freeze gelling method of generating and setting a foam contemplates enzymatic decomposition of hydrogen peroxide admixed with the latex to cause it to froth and then gelling the foam by first freezing it and subsequently causing its frozen perforate structure to be permeated with coagulating gas.

Freeze gelling may be carried out in the mold with the assistance of circulation of a liquid refrigerant through the mold flanking conduit tubes 24 and the fast conductance of heat up out of the mold cavity by the metallic spikes 26 depending fixedly from the mold cover 16. This operation is referred to in fuller detail in our copending application, Serial No. 360,043, filed June 8, 1953, now Patent No. 2,687,979.

This results in an integral cushioning body 18 of combination material having the broadside face 20 and comprising resilient cellular material 19 reinforced by combined network pieces of mutually intermingling resilient hairs or fibers embedded in the cellular material, the fibers of which body have a preponderance of their lengths oriented in concerted directions, namely up and down in Figs. 5 and 6, or more nearly crosswise the broadside face 20 of the finished cushioning body 18 than parallel therewith. In consequence the cushioning body 18 while no heavier nor denser than cushioning bodies of the older styles of combination material is much more strongly resistive to compressive forces applied thereto in directions normal to its broadside surface.

Figure 1:
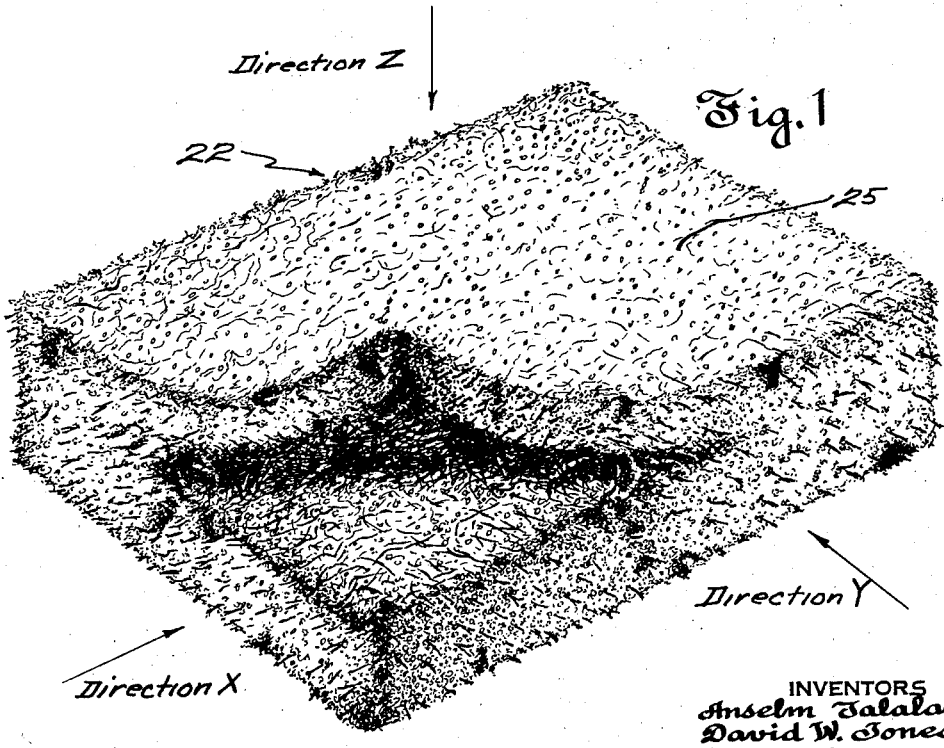
Fig. 1 shows a slab of "combination" material illustrating a structural disposition of fibers common to cushioning bodies of such material prior to this invention.

The older styles of cushioning body made of composition material are illustrated by the cushioning body 22 of Fig. 1, wherein, prior to this invention, the fibers proposed to be embedded in the cellular rubber have had a preponderance of their lengths oriented in directions more nearly parallel with than perpendicular to the broadside face 25 of the finished cushioning body.

Fig. 3 illustrates elongated pieces having modified shapes that may be cut from a bat or empty network of rubberized hair. The surfaces of these pieces that lay in the aforesaid bat-forming direction X or Y are designated 27 while the surfaces resulting from cutting across the lengths of most of the fibers through the thickness of the bat are designated 31. The caterpillar-shaped pieces 28 have notches 29 which are snugly fitted and filled by key shaped pieces 30 so that the broken away assemblage of these pieces shown in Fig. 4 can be made while the interstices in the network of the pieces remain empty.

Figure 2:
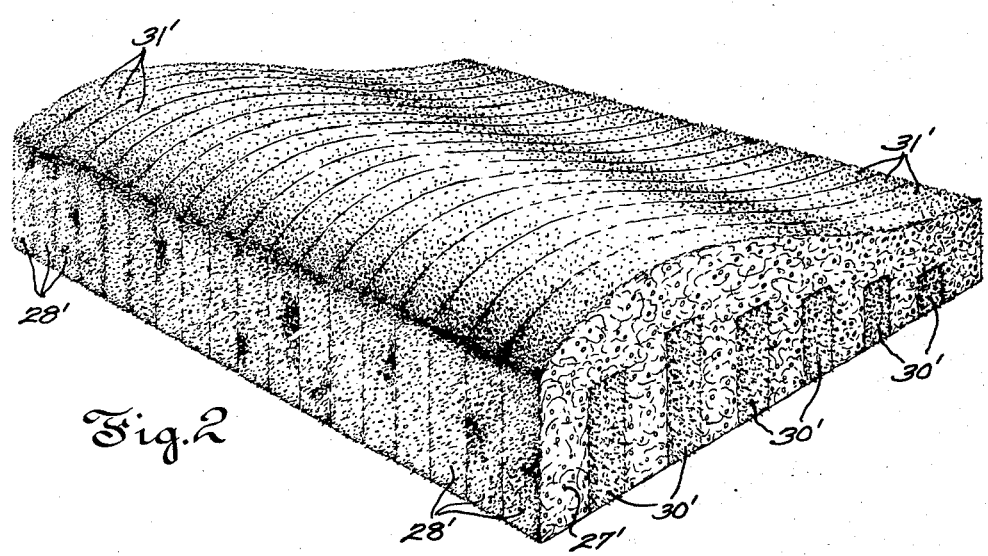
Fig. 2 shows a cushioning body comprising a combination material in which separate elongate pieces of dry rubberized hair are integrated into a nonseparable assemblage or integral body by means of an undivided unitary continuous mass of foam rubber permeating the whole assemblage according to the present improvements.

When the assembled skeleton structure of Fig. 4 is confined in a mold cavity that conforms to its overall size and shape and all of the interstices of the combined pieces are entirely filled by a continuous undivided mass of vulcanized foam rubber in a manner similar to that explained with respect to the mold of Figs. 6 and 7, the cushioning body of Fig. 2 will result characterized by the same new principle of fiber relationship as in the cushioning body 18 in Fig. 6.

In Fig. 5 it will be observed that the convex contour of the broadside surface of the assemblage that is uppermost in Fig. 3, and inverted, or upside down in Fig. 4, is composed solely of a series of laminae of the strips 28 that extend in closely abutting parallel relation inasmuch as the keys 30 do not extend into a position to be exposed at said mounded broadside surface.

Steps of the method of manufacture which result in an improved cushioning body structure incorporating the invention herein claimed, are claimed in our aforesaid copending application, Serial No. 360,043, filed June 8, 1953, now Patent No. 2,687,979.

Having illustrated and described various shapes and arrangements of dry strips of rubberized hair network that may be unified by a continuous body of cellular rubber extending undividedly throughout the assemblage thereof to produce a cushioning body of combination material embodying the new principle of fiber disposition characterizing this invention, the following claims are directed to and intended to cover all equivalent shapes and arrangements of fibrous bodies that would be suggested by the disclosure hereof and that fairly fall within a broad interpretation of the wording of the claims.

We claim:

1. A cushioning body having a broadside face and embodying an assemblage of component discrete sections, each section comprising a skeleton framework of long resilient filaments coated with a vulcanized aqueous dispersion of an elastomer and thereby spot bonded together in mutual entanglement with communicating interstices throughout, and a unitary undivided continuous cellular mass of compressible resilient material extending throughout the interstices of a plurality of said sections thereby uniting the same, a preponderance of said filaments in each of said sections having their lengths disposed in concerted directions more nearly perpendicular to than parallel with said broadside face of the cushioning body, whereby said body is rendered relatively more resistive to compressive forces applied against said broadside face of the body than to forces applied against other faces thereof.

2. A cushioning body as defined in claim 1, in which the said discrete sections are in mutual abutting contact and the said cellular mass comprises a body of foam rubber continuous between and connecting the said sections.

3. A cushioning body as defined in claim 1, in which the said filaments of the said discrete sections comprise rubber coated animal hairs having end portions contiguous to rubber coated animal hairs of an adjacent section.

4. A cushioning body as defined in claim 1, in which the said filaments of the said discrete sections comprise rubber coated animal hairs having end portions terminating contiguous to rubber coated animal hairs of an adjacent section and the said cellular mass comprises a body of foam rubber continuous between and connecting the said section.

5. A cushioning body as defined in claim 1, in which the said discrete sections are in mutual abutting contact and the said cellular mass is continuous between and connects the said sections.

6. A cushioning body having a broadside face and embodying an assemblage of elongate component discrete sections amassed in side by side mutual abutment with some of said abutting sections extending crosswise of others of said sections, each section comprising a skeleton framework of long resilient filaments coated with a vulcanized aqueous dispersion of an elastomer and thereby spot bonded together in mutual entanglement with communicating interstices throughout, and a unitary undivided continuous cellular mass of compressible resilient material extending throughout the interstices of a plurality of said sections thereby uniting the same, a preponderance of said filaments in each of said sections having their lengths disposed in concerted directions more nearly perpendicular to than parallel with said broadside face of the cushioning body, whereby said body is rendered relatively more resistive to compressive forces applied against said broadside face of the body than to forces applied against other faces thereof.

7. A cushioning body as defined in claim 6, in which some of the said sections contain notches extending crosswise thereof, a plurality of said notches being occupied by a single one of the said crosswise extending sections whereby to oppose side sway of said notched sections.

References Cited in the file of this patent
UNITED STATES PATENTS

| | | |
|---|---|---|
| 970,950 | Rasch | Sept. 20, 1918 |
| 1,877,055 | Rupert | Sept. 13, 1932 |
| 2,297,204 | Deissner | Sept. 29, 1942 |
| 2,649,900 | Pfankuch | Aug. 25, 1953 |